United States Patent [19]

Chapman

[11] Patent Number: 4,523,746
[45] Date of Patent: Jun. 18, 1985

[54] LOAD PICKUP COUPLING DEVICE AND METHOD

[76] Inventor: Claude L. Chapman, 3300 W. Union Ave., Englewood, Colo. 80110

[21] Appl. No.: 405,168

[22] Filed: Aug. 4, 1982

Related U.S. Application Data

[62] Division of Ser. No. 154,878, May 30, 1980, Pat. No. 4,348,009.

[51] Int. Cl.³ .............................................. B64D 1/22
[52] U.S. Cl. .................... 258/1.2; 244/137 R
[58] Field of Search .................. 258/1.2, 1.4, 1.6, 1.8, 258/22; 244/137 R, 118.1; 212/117

[56] References Cited

U.S. PATENT DOCUMENTS

| | | | |
|---|---|---|---|
| 800,135 | 9/1905 | Bostian | 258/22 |
| 1,581,674 | 4/1926 | Brown | 258/1.2 |
| 1,640,667 | 8/1927 | Osborn | 258/1.2 |
| 2,487,798 | 11/1949 | Griesinger et al. | 258/1.2 |
| 2,488,538 | 11/1949 | Hoehn et al. | 258/1.2 |
| 3,601,342 | 8/1971 | Piasecki | 244/137 R |
| 3,845,937 | 11/1974 | Johnson et al. | 258/1.8 |
| 4,124,181 | 11/1978 | Kolwey | 244/137 R |

Primary Examiner—F. J. Bartuska
Attorney, Agent, or Firm—Ancel W. Lewis, Jr.

[57] ABSTRACT

The problem of readily picking up a load using an aircraft without requiring ground personnel is solved by a coupling device (15) and a method of coupling a load using same. The coupling device includes a pivot member (17) pivotally mounted on the load having a disposition and configuration that is readily engaged by a hoist line (42) with an end or weight member (43) from above and guided into a retainer portion (22) so that as the hoist line is raised a connection is formed between the hoist line and the load. The pivot member serves as a load-bearing member during suspension. Upon deployment and relief of the weight of the load from the hoist line, the pivot member automatically returns to the starting position and the hoist line and end member are slid therefrom. Stringing apparatus inclusive of a support member (72) carrying front and rear coupling devices (15) and front and rear tower catches (75 and 76) is particularly effective in stringing line through the tower in accordance with a novel method of line stringing.

16 Claims, 15 Drawing Figures

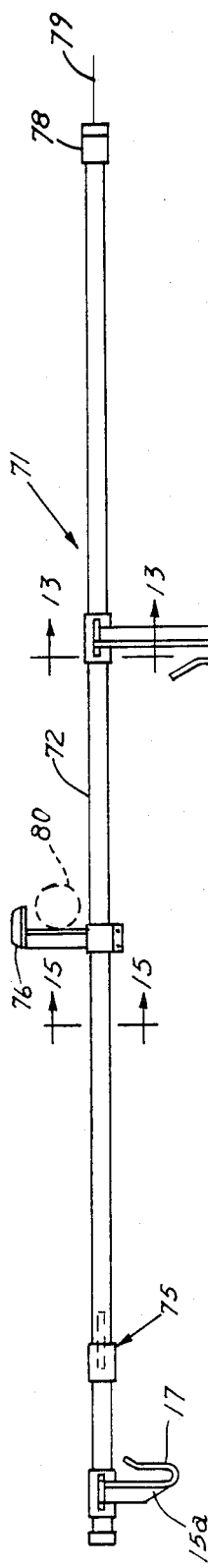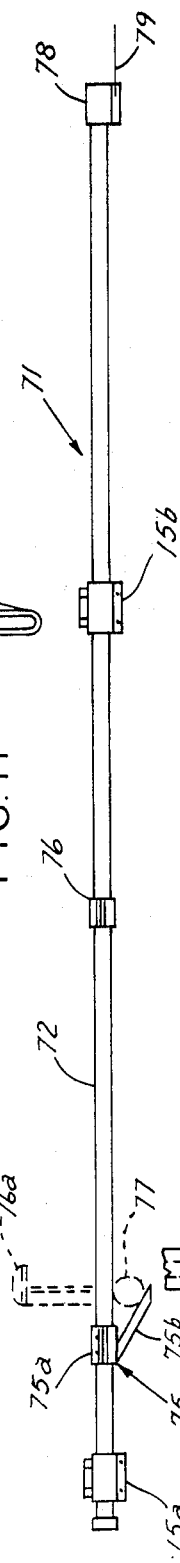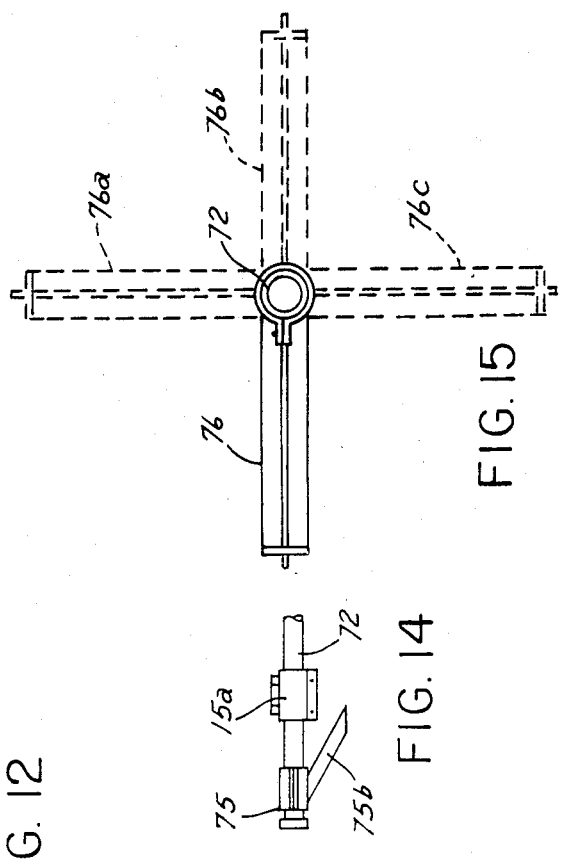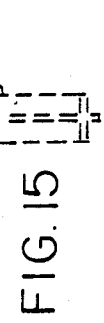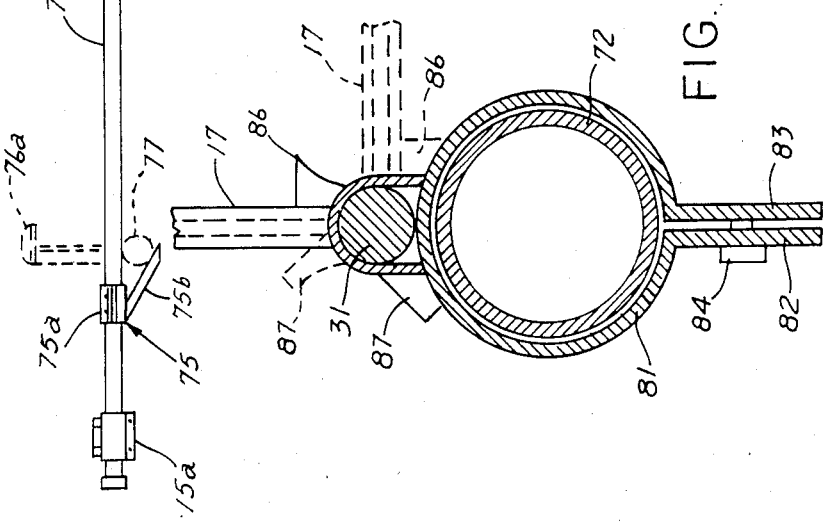

4,523,746

LOAD PICKUP COUPLING DEVICE AND METHOD

This application is a division, of application Ser. No. 154,878, filed May 30, 1980 now U.S. Pat. No. 4,348,009.

TECHNICAL FIELD

This invention generally relates to load pickup coupling devices suitable for the retrieval of a load from above by an aircraft and coupling devices and methods that are particularly well suited for use in the airborne stringing of a line through line-holding structure on a power line.

BACKGROUND ART

The helicopter has many advantages for moving different types of loads from place to place and is particularly effective in retrieving and moving loads in remote or inaccessible areas. One problem encountered in airlifting loads using this aircraft with a depending hoist line is the connecting of the lower end of the hoist line to the load. In the past the most common practice has been to use a grappling hook or some other type of hook on the end of a hoist line to hook into the load or a cable attached to the load. In most cases ground personnel is used to make certain there is a reliable connection between the hoist line and the load.

In many aerial load pickup situations it is also highly desirable to be able to readily release the load from the hoist line without ground personnel. An example of the requirements of this type of coupling is disclosed in my copending application Ser. No. 103,348, entitled "Apparatus and Methods for Line Stringing", wherein a needle-like structure is carried by the hoist line suspended from a helicopter to thread the line through tower supported line-holding structure and particularly a tower with line holding structure that has no side access such as for stringing the center line.

Accordingly, it is an object of the present invention to provide a novel and improved load pickup coupling device between a hoist line and a load that may be applied generally to load pickups from an aircraft, the methods related thereto, and more particularly to the stringing of a sock line associated with stringing electric power lines.

DISCLOSURE OF INVENTION

In accordance with the present invention there is disclosed a load pickup coupling device and method for use in retrieving a load by a helicopter and like aircraft which includes a pivot member shown in the form of a hook-like structure or a bail-like structure defining a central receiving area disposed in a substantially horizontal plane. The hook-like pivot member is pivotally mounted to pivot relative to the load about a horizontal axis from a generally prone position to an upright suspended position.

The configuration and disposition of the pivot member is such that a hoist line with an enlarged end member or weight below the pivot member may pass into the receiving area and into a retainer portion defining an internal retainer area that is smaller than the end member and arranged so that as the hoist line and end member are raised by the aircraft the end member engages the retainer portion, the pivot member is pivoted to an upright position, and a load-bearing connection is established between the hoist line and load. When the weight of the load is supported by something other than the hoist line, the pivot member pivots back to the horizontal position and the hoist line and end member slide from the retainer portion and out through the receiving area of the pivot member.

This coupling device on a line stringing needle provides for a ready connection and disconnection to a hoist line carried by an aircraft for stringing a sock line associated with power lines.

BRIEF DESCRIPTION OF DRAWINGS

The details of this invention will be described in connection with the accompanying drawings, in which:

FIG. 11 is a top plan view of a line stringing apparatus using two of the coupling devices above described;

FIG. 12 is a side elevation view of the device shown in FIG. 6;

FIG. 13 is an enlarged sectional view taken along lines 13—13 of FIG. 12;

FIG. 14 is a side elevation view of another arrangement for the front coupling device and front catch; and FIG. 15 is a sectional view taken along lines 15—15 of FIG. 11 with alternate positions for the rear catch shown in dashed lines.

DETAILED DESCRIPTION

Figure 1:
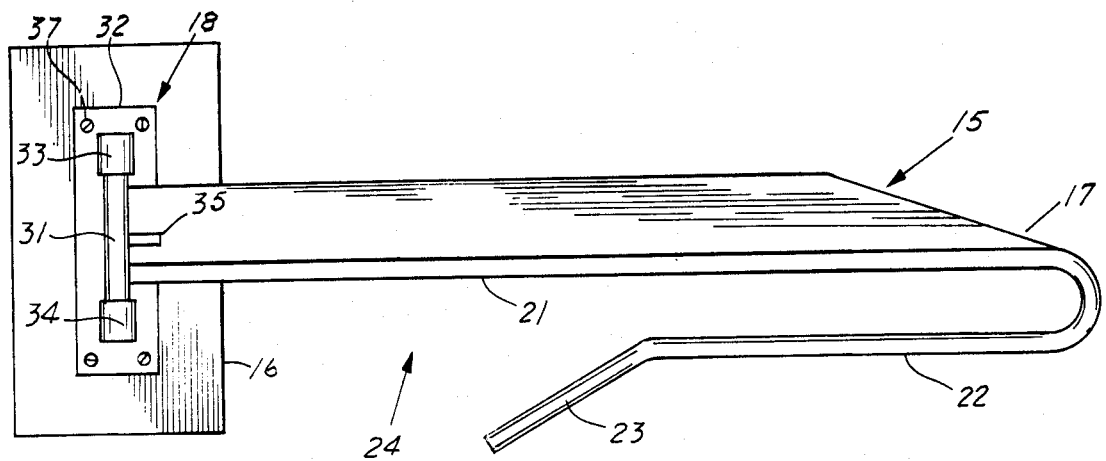
FIG. 1 is a top plan view of a coupling device embodying features of the present invention.
Figure 2:
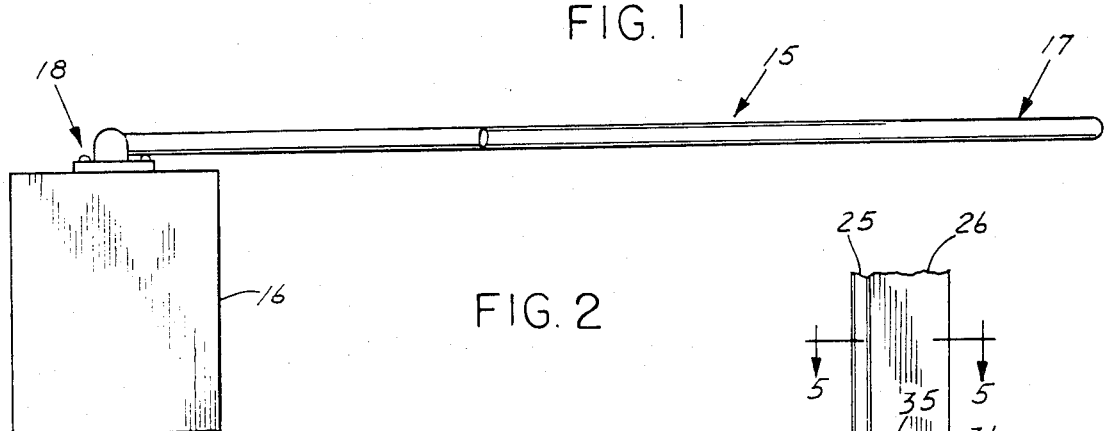
FIG. 2 is a side elevation view of the coupling device shown in FIG. 1.
Figure 3:
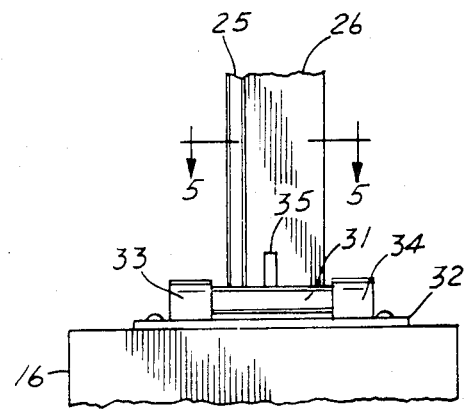
FIG. 3 is an enlarged end elevation view of a portion of the coupling device shown in FIG. 1 with the pivot member upright.
Figure 4:
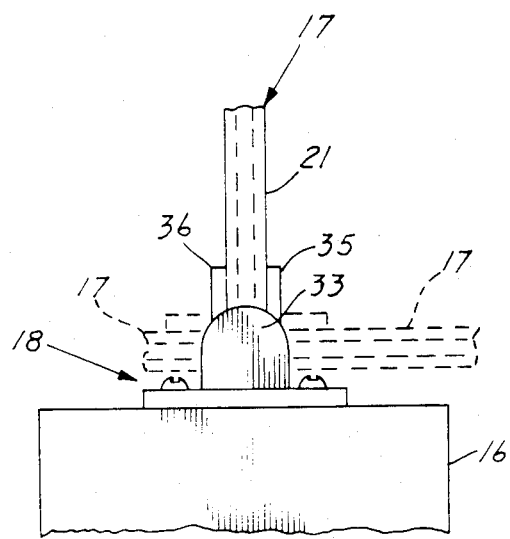
FIG. 4 is an enlarged side elevational view of the pivot assembly of FIG. 2.
Figure 5:
FIG. 5 is a sectional view taken along lines 5—5 of FIG. 3.

Referring now to the drawings, a load pickup coupling device 15 shown is mounted on a load 16 represented in a general form as a rectangular block. This coupling device 15, generally stated, has a single hook-shaped pivot member 17 pivotally connected at one end to the top of the load by a pivot assembly 18 to pivot about a substantially horizontal axis between selected positions described hereinafter.

The pivot member 17 shown is comprised of a shank portion 21 and a U-shaped retainer portion 22 with an outwardly flared end portion 23 opposite assembly 18 which define an interior receiving area with a receiving opening 24 for the line along one side opposite the shank portion and between the end of the end portion 23 and the load. This configuration for the pivot member and the fact that it is disposed substantially on its side in a prone position as shown in FIG. 1 provides a load-supported, line-engaging target area for the hoist line.

In practice the hoist line and end member are moved by the aircraft and engage the pivot member so that its external edge assists in guiding the hoist line toward the opening in the hook between the flared end portion and the load. The outwardly flared end portion facilitates guiding of the hoist line into the opening in the hook and against the inner edge of the shank portion, which then serves as a line-engaging target area for the hoist line and guides the hoist line into the retainer portion 22. The retainer portion 22 is larger than the cross section of the hoist line and smaller than the cross section of the end member carried by the hoist line. Once carried by the hoist line, the pivot member 17 and its pivotal connection at the assembly 18 become load-bearing or load-supporting members between the hoist line and load.

The pivot member 17 shown is made of a solid rod 25 of circular cross section with a reinforcing plate 26 that extends along the shank portion and one side of the retainer portion for added strength.

The pivot assembly 18 for the pivot member 17 includes a transverse pivot rod 31 affixed to the end of the shank portion opposite the retainer portion adapted to rotate about a horizontal axis, together with a mounting plate 32 which carries a pair of sleeve bearings 33 and 34 affixed thereto. The pivot rod 31 is telescopically received in and retained at opposite ends by the sleeve bearings 33 and 34.

A horizontal stop 35 is carried by the shank portion and engages the mounting plate 32 to hold the pivot member 17 in the horizontal position on one side, and a horizontal stop 36 is mounted on the opposite side of the pivot member to hold the pivot in a horizontal position when swung to an opposite position as shown in dashed lines. It is understood that the stops 35 and 36 may be shaped to position the pivot member at an upward incline to the horizontal if desired, but in most cases this angle would be small and would not exceed 45°. Screw fasteners 37 are shown holding the mounting plate to the load. While a mounting plate is shown, it is understood that other fastening techniques may be used to fasten the pivot assembly 18 to the load and other forms of pivots may be used to pivotally mount the pivot member 17 to a load.

Figure 6:
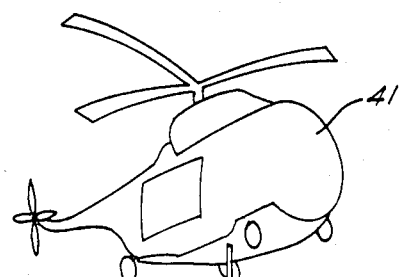
FIG. 6 is a pictorial view of the deployment of a helicopter with a hoist line having an end member on the lower end for engaging the coupling device shown in FIG. 1.
Figure 7:
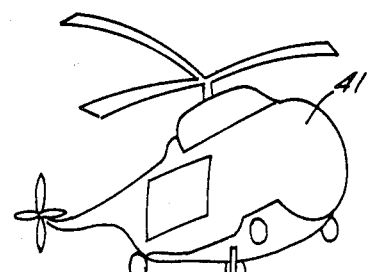
FIG. 7 is a pictorial view of the load being carried by the helicopter via the coupling device.
Figure 8:
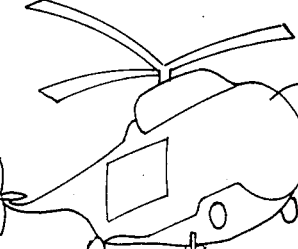
FIG. 8 is a pictorial view of the load in a ground-supported position with the pivot member moving with the end member extending back toward a horizontal position prior to release of the end member and hoist line from the device.

Referring now to FIGS. 6–8, the load 16 with a coupling device 15 mounted thereon, as above described, is shown on a supporting surface 38. A helicopter-type aircraft 41 has a hoist line 42 suspended thereon with an end member 43 in the form of a ball forming a weight on the lower end. Shapes other than spherical could be used.

The helicopter positions the end member 43 below the pivot member and the line 42 is moved toward the shank portion 21 through the receiving opening 24, usually against the inner edge of the shank portion wherein it is guided thereby into the retainer portion 22. The end member 43 is then raised against the retainer portion and at the same time the pivot member swings up about the pivot and forms a connection between the load and the helicopter so that the helicopter may elevate the load, as shown in FIG. 7.

To release the load from the hoist line, upon the placement of the load on a support surface the pivot member will tend to swing in the direction of the end member 43 and lie back down to the horizontal position, whereupon the end member 43 may be slid from the retainer portion and out the receiving opening of the hook in reversal of motion to that of its application.

Figure 9:
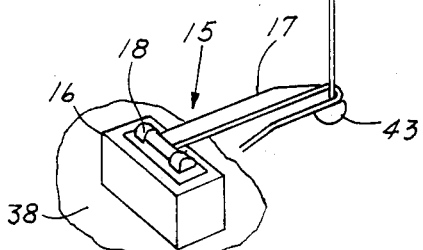
FIG. 9 is a top plan view of another form of aerial coupling device embodying features of the present invention.
Figure 9:
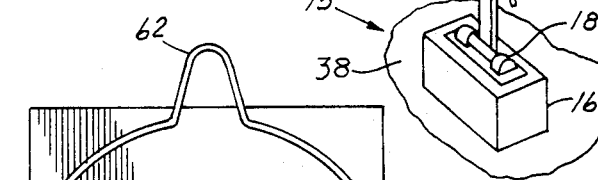
Figure 10:
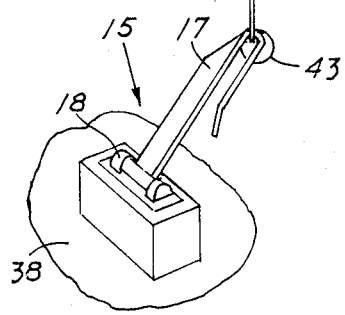
FIG. 10 is a side elevation view of the device shown in FIG. 9.
Figure 10:
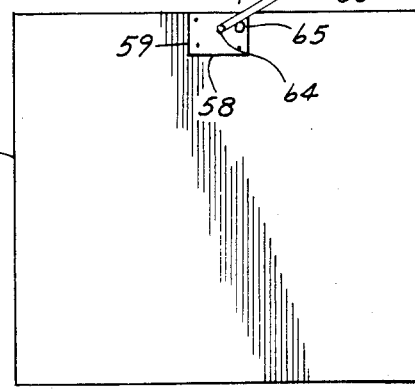

In FIGS. 9 and 10 there is shown another form of coupling device 55 including a pivot member 57 and a pivot assembly 59 connected at each end to the load 16. Pivot member 57 is in the nature of a modified U-shaped bail comprised of a pair of oppositely disposed, spaced, arcuate shank portions 60 and 61, each pivotally connected at one end to the load and connected at the opposite end to a U-shaped retainer portion 62. The shank portions 60 and 61 form a receiving area through which the end member will insert and the inside edges guide the hoist line into the retainer portion. Again the retainer portion 62 is smaller in size than the end member to form the connection.

The pivot assembly 59 at each end is shown to include a mounting plate 58 held to the load as by bolt fasteners with a pivot stud 63 extending through a hole in the end of the shank portion having a retainer head 64. Suitable stops 65 are provided on each shank portion to dispose the pivot member at an angle to the horizontal, preferably of about 30° but usually not more than 45°. The angular position allows the hoist line and end member to be moved into the receiving area toward the retainer portion 62 from the side. This configuration for member 57 provides a generally wider target area for the hoist line and end member.

The operation of the coupling device 55 is similar to that of device 15 above described and the interior receiving area formed by the pivot member must be large enough for the end member on the hoist line to be moved into the receiving area from the side toward the retainer portion 62. The width of the retainer portion 62 allows the line to slide thereinto and engage the end member when it is pulled up against same.

The line stringing apparatus 71 shown in FIGS. 11–13 is of the general type and similar in operation to that shown and described in my above-mentioned co-pending application and includes a support member 72 in the form of an elongated cylindrically shaped rod, a front hoist line fastener or coupling device 15a attached at the front end of the support member 72, and a rear hoist line fastener or coupling device 15b attached to the support member 72 between the ends thereof a selected distance behind coupling device 15a.

The stringing apparatus further has a front tower catch 75 adjacent to and rearwardly of the front coupling device 15a and a rear tower catch 76 forwardly of the rear coupling device 15b. A line fastener 78 is connected to the rear end of the support member for fastening the sock or pull line 79 to the support member 71. The line fastener 78 has a mounting bracket clamped to the support member 71 and a clevis held by the fastening bolts. The sock line 79 is secured to the clevis.

Coupling devices 15a and 15b are of a construction similar to device 15 above described and differ from one another only in the relative proportions of the shank portion and retainer portions. The front coupling device is shorter for added strength. As shown in FIG. 13, each of these coupling devices 15a and 15b has a pipe-clamp-type circular mounting bracket 81 that fits around the support member 72 and has flange plates 82 and 83 through which one or more bolt fasteners 84 pass to releasably clamp the coupling device to the support member at the desired position. This allows the member to be located at any position along the support member and be adjustably moved as required.

The pivot member carries a stop 86 to hold it in the horizontal position and a stop 87 to hold it in the upright position or at any desired angular position in between. For some applications the stops enable the pivot member to swing a full 180°, as is shown in FIG. 1.

The front tower catch 75 includes a releasable and slidable mounting bracket portion 75a similar to bracket 81 above described to permit this catch to be slidable along the support member 72 and located at a selected position by tightening the bolt fasteners that extend through the flanges of the bracket, together with a rearwardly and downwardly inclined hooking arm portion 75b adapted to hook over the top of the cross support on the tower designated by dashed lines at 77. The front tower catch 75 may also be located forwardly of the front coupling device 15a, as shown in FIG. 14.

The rear tower catch 76 includes a releasable and slidable mounting bracket portion similar to bracket 81 above described and has an outwardly and rearwardly extending arm portion provided with flat surfaces that are particularly suited for engaging wood. The rear tower catch 76 shown in FIGS. 11 and 15 extends laterally out from one side of the support member 72 opposite the normal position for the pivot member 17 and is positioned for a side hookup with the upright side pole of a support tower indicated at 80.

The rear tower catch 76 may be disposed at the opposite side at 76b, on top as indicated at 76a, or on the bottom as indicated at 76c with respect to the support member, as shown in dashed lines in FIG. 15, depending on the type of tower engagement or hookup required. The upstanding or top disposition indicated at 76a with the catch located forwardly and adjacent catch 75, as shown in dashed lines in FIG. 12, is particularly suited for having the catch engage the underside or bottom of a cross support 77 on a tower.

A preferred procedure for stringing a sock line through the line-holding structure of a tower that has no side access, such as the center line, using line stringing apparatus 71 above described, is as follows:

The end member or ball 43 on the end of the hoist line is placed in the front coupling device 15a and the line stringing apparatus 71 is moved in by the aircraft and set on the top of the cross support 77 of the tower or other support structure with arm portion 75b hooked on support 77 and the sock line 79 providing a tension to hold apparatus 71 in place. The line and end member are removed from the front coupling device 15a and connected to the rear coupling device 15b, which is the loaded position ready for threading.

The line stringing apparatus 71 is then lifted off the tower, backed up and threaded through the tower by manipulating the aircraft. The top front catch 76a may hook the bottom of the tower or the side mount front catch may hook the side of the tower, according to the type of tower, and the stringing apparatus is again supported by the tower. The end member 43 is decoupled from the rear coupling device 15b and hooked into the front coupling device 15a and the line 79 is threaded through the tower and moved down to the next tower by the aircraft, where the front catch is again set on the top cross support 77 and the above procedure is repeated.

Although the present invention has been described with a certain degree of particularity, it is understood that the present disclosure has been made by way of example and that changes in details of structure may be made without departing from the spirit thereof.

What is claimed is:

1. A hookup device for performing repeated hookups with and disengagements from the lower end of a hoist line suspended from an aircraft, said hookup device comprising:

an end member on said hoist line;
arm means having an outline as viewed from the top that defines a target area with an opening for the entry and exit of the hoist line, said arm means including:
a guide portion including an inner edge along which said hoist line is guided in moving toward a retained position and
a retainer portion integral with and forming an extension of said guide portion so that said guide portion is carried with said retainer portion when suspended from said hoist line, said retainer portion having an end stop and a pair of spaced arms extending from the opposite ends of said stop, said arms being spaced apart wider than the thickness of said hoist line to permit the hoist line to be passed into said retainer portion and against said stop after being guided by said guide portion and narrower than said end member so that said end member cannot pass through said retainer portion,
said arm means being movable between a first position and a second position, said first position being along a horizontal plane or tilted up with respect to said horizontal plane so that said retainer portion is higher than said opening, said second position being at an angle to the horizontal greater than the tilted-up angle; and
support means positioning said arm means at said first position ready to receive said hoist line via said opening with sufficient clearance under said arm means to permit said end member to move under said retainer portion and be drawn up and in contact with the bottom of said retainer portion, the application of upwardly directed forces to said end member raising said arm means to said second position to effect a connection between said hoist line and said arm means during the flight of said arm means in which an end portion of said hoist line adjacent said end member extends around said end stop and said end member due to its size in relation to said retainer portion is prevented from passing through said retainer portion,
said end member dropping out of contact with the bottom of said retainer portion and said hoist line being passed back through said opening to disengage said arm means, said arm means returning to said first position ready to receive said hoist line and end member for the next hookup when the support means is supported from means other than said hoist line.

2. A device as set forth in claim 1 wherein said arm means is in the form of a single hook-like arm member.

3. A device as set forth in claim 2 wherein said arm member includes a rod of generally circular cross section having a reinforcing plate along the shank and an adjacent portion of the U-shaped bend of the hook for added strength.

4. A device as set forth in claim 1 wherein said arm member has an outwardly flared end portion to facilitate the movement of the hoist line into said retainer portion.

5. A device as set forth in claim 1 wherein the connection from said arm member to said support means includes a transverse rod on the end of said shank portion and at least one sleeve-type bearing telescoped over said transverse rod, said bearing being connected to said support means.

6. A device as set forth in claim 5 including a mounting member on which said bearing is mounted, said mounting member being adapted to fasten to said support means.

7. A device as set forth in claim 5 including a stop on said arm member adapted to engage said mounting member to limit the movement of said arm member to a substantially prone position on its side in said first position.

8. A device as set forth in claim 5 wherein said mounting member is a substantially flat plate.

9. A device as set forth in claim 5 wherein said mounting member is a sleeve-like clamp with opposed outwardly extending clamping flanges adapted to releasably clamp onto a tubular body.

10. A device as set forth in claim 9 wherein said arm member has a pair of stops to limit the pivotal movement between a substantially upright and a substantially horizontal position when mounted on a tubular body.

11. A device as set forth in claim 1 wherein said arm means is in the form of a bail-like arm member disposed at an angle to the horizontal and having a pair of opposed, spaced, shank portions each pivotally mounted at one end and joined by a substantially U-shaped retainer portion at the opposite end, said arm member defining an interior receiving area for the hoist line and end member, the U-shaped retainer portion being smaller in size than the end member and larger in size than said hoist line to slidably receiving said hoist line from the side of said arm member.

12. A device as set forth in claim 1 wherein said end member is in the form of a ball forming a weight at the lower end of the hoist line.

13. A device as set forth in claim 1 wherein in the suspended position the arm member is a load-bearing member.

14. A device as set forth in claim 1 wherein said support means has a load associated therewith.

15. An aerially applied hookup device for performing repeated hookups with and disengagements from the lower end of a hoist line suspended from an aircraft, said hookup device comprising:
an enlarged end member on the lower end of said hoist line;
an arm member having an outline as viewed from the top that defines a target area with an opening for the entry and exit of the hoist line, said arm member including:
an elongated guide portion including an inner edge along which said hoist line is guided in moving toward a retained position and
a generally U-shaped retainer portion integral with and forming an extension of said guide portion so that said guide portion is carried with said retainer portion when suspended from said hoist line, said retainer portion having an end stop and a pair of spaced arms extending from the opposite ends of said stop, said arms being spaced apart wider than the thickness of said hoist line to permit the hoist line to be passed into said retainer portion and against said stop after being guided by said guide portion and narrower than said end member so that said end member cannot pass through said retainer portion,
said arm member being movable between a first position and a second position, said first position being along a horizontal plane or tilted up with respect to said horizontal plane so that said retainer portion is higher than said opening, said second position being at an angle to the horizontal greater than the tilted-up angle; and
support means operatively associated with a load to be moved from location to location, said support means positioning said arm member at said first lowered position ready to receive said hoist line via said opening with sufficient clearance under said arm member to permit said end member to move under said retainer portion and be drawn up and in contact with the bottom of said retainer portion, the application of upwardly directed forces to said end member raising said arm member to said second position to effect a connection between said hoist line and said arm member during the flight of said arm member in which an end portion of said hoist line adjacent said end member extends around said end stop and said end member due to its size in relation to said retainer portion is prevented from passing through said retainer portion,
said end member dropping out of contact with the bottom of said retainer portion and said hoist line being passed back through said opening to disengage said arm means, said arm member returning to said first position ready to receive said hoist line and end member for the next hookup when the support means is supported from means other than said hoist line.

16. A method of performing repeated hookups with and disengagements from a hoist line carried by an aircraft comprising the steps of:
flying a hoist line having an end member toward a hookup device including an arm having an outline as viewed from the top that defines a target area with an opening for the entry and exit of the hoist line;
moving the hoist line through said opening, along a guide surface of said arm, and into a retainer portion of said arm, said retainer portion being narrower than said end member so that said end member cannot pass through said retainer portion;
moving said end member up against the bottom of said retainer portion and raising said arm from a ready position to a raised suspended position to effect a connection between said hoist line and arm in which an end portion of the hoist line adjacent the end member extends around said retainer portion and the end member, due to its size, is prevented from pulling through said retainer portion and to suspend the hookup device from the aircraft;
flying the hookup device to a second location and positioning the device so that it is supported from below with said arm returning to said ready position; and
dropping the end member out of the retainer portion and passing said hoist line through the exit opening to disengage the hoist line from the arm means.

* * * * *